US012757099B2

(12) United States Patent
Yang et al.

(10) Patent No.: US 12,757,099 B2
(45) Date of Patent: Oct. 6, 2026

(54) SYSTEMS AND METHODS FOR TRAFFIC STEERING IN RADIO ACCESS NETWORK BASED ON TRANSPORT NETWORK AND CORE NETWORK INFORMATION

(71) Applicant: Verizon Patent and Licensing Inc., Basking Ridge, NJ (US)

(72) Inventors: Jin Yang, Orinda, CA (US); Mark T. Watts, Newport, RI (US); Kristen Sydney Young, Mine Hill, NJ (US); Vishwanath Ramamurthi, San Ramon, CA (US); Edward Diaz, Bridgewater, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 476 days.

(21) Appl. No.: 18/170,269

(22) Filed: Feb. 16, 2023

(65) Prior Publication Data

US 2024/0284298 A1 Aug. 22, 2024

(51) Int. Cl.
*H04W 40/12* (2009.01)
*H04W 76/18* (2018.01)

(52) U.S. Cl.
CPC ........... *H04W 40/12* (2013.01); *H04W 76/18* (2018.02)

(58) Field of Classification Search
CPC .............................. H04W 40/12; H04W 76/18
See application file for complete search history.

(56) References Cited

U.S. PATENT DOCUMENTS 11,197,200 B2 * 12/2021 Yang ..................... H04L 47/283
11,496,573 B2 * 11/2022 Dao ...................... H04W 48/04
11,516,100 B1 * 11/2022 Zheng ................. H04L 43/0847
2015/0295835 A1 * 10/2015 Yang ....................... H04L 47/18 370/235
2017/0272960 A1 * 9/2017 Li ........................... H04L 43/16
2020/0328953 A1 * 10/2020 Taft ....................... H04L 43/091
2021/0014737 A1 * 1/2021 Yang ..................... H04W 76/11
2021/0058302 A1 * 2/2021 Marquezan ........... H04L 41/142
2021/0195683 A1 * 6/2021 Xin ....................... H04W 80/12
2022/0224635 A1 * 7/2022 Watts ...................... H04L 43/16
2022/0232399 A1 * 7/2022 Bellamkonda ........ H04W 88/06
2023/0027969 A1 * 1/2023 Vasseur ................... H04L 43/16
2023/0047867 A1 * 2/2023 Gundavelli ....... H04W 36/0085
2025/0080446 A1 * 3/2025 Choudhary ........... H04W 24/04

* cited by examiner

*Primary Examiner* — Mounir Moutaouakil

(57) ABSTRACT

A device may include a processor configured to receive a request to establish a communication session or data flow for a user equipment (UE) device connected to a Radio Access Network (RAN). The processor may be further configured to obtain key performance indicators (KPI) information relating to one or more KPIs for a plurality of paths in a transport network used by the RAN to connect to a core network; determine a KPI requirement for the communication session or data flow to be established; select a path in the transport network based on the obtained KPI information and the determined KPI requirement; and establish the communication session or data flow in the transport network using the selected path.

20 Claims, 9 Drawing Sheets

SYSTEMS AND METHODS FOR TRAFFIC STEERING IN RADIO ACCESS NETWORK BASED ON TRANSPORT NETWORK AND CORE NETWORK INFORMATION

BACKGROUND INFORMATION

To satisfy the needs and demands of users of mobile communication devices, providers of wireless communication services continue to improve and expand their networks. One aspect of such improvements includes the development of wireless access networks and options to utilize such wireless access networks. A provider may operate a wireless access network that manages a large number of user devices using different types of services. Managing different types of services poses various challenges.

DETAILED DESCRIPTION OF EMBODIMENTS

Figure 1:
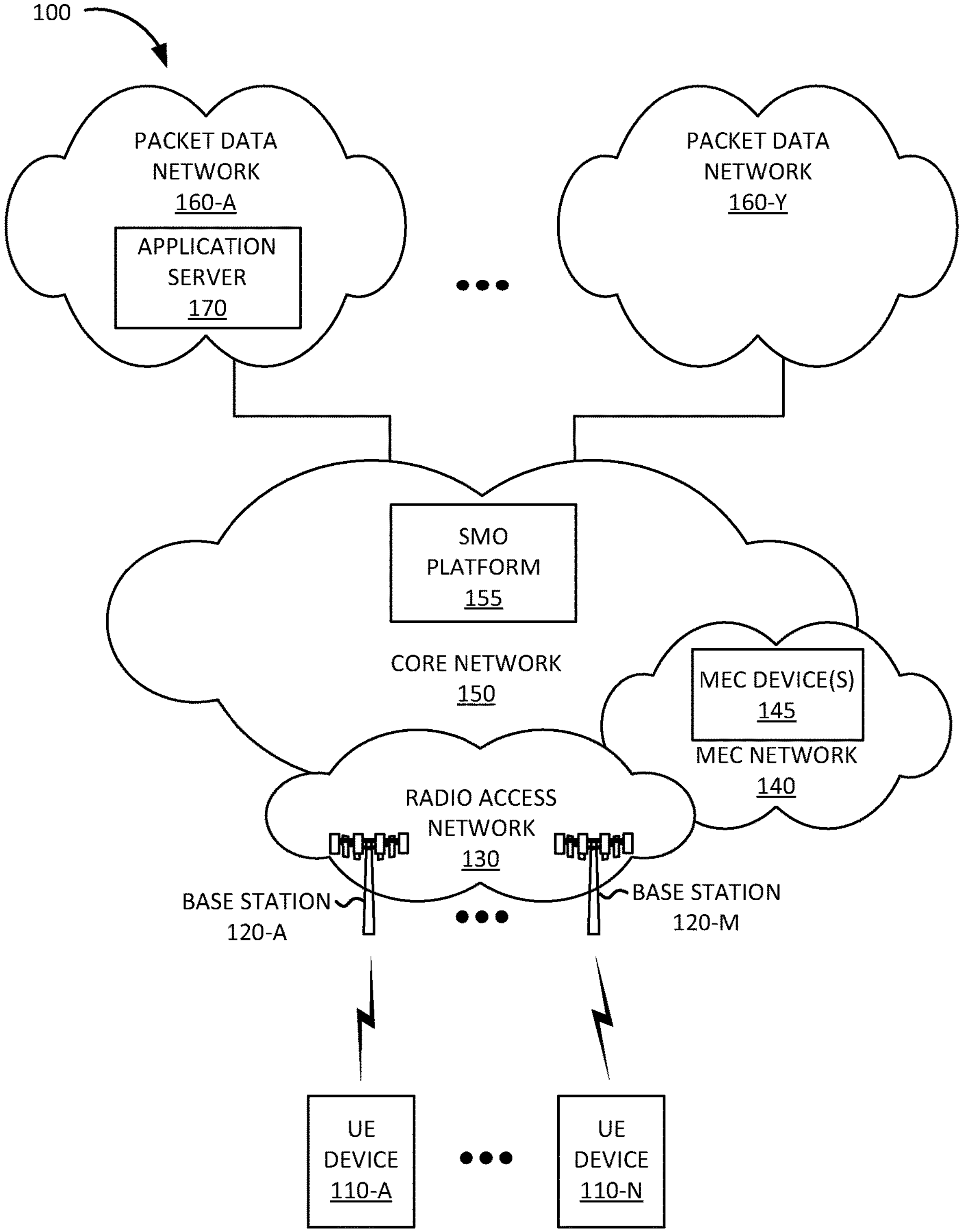
FIG. 1 illustrates an environment according to an implementation described herein.

The following detailed description refers to the accompanying drawings. The same reference numbers in different drawings identify the same or similar elements.

A cellular wireless network enables user equipment (UE) devices to connect to networks via a Radio Access Network (RAN) and a core network in order to communicate with other devices connected to the RAN, communicate with devices in other networks, access applications or services hosted by a provider in the core network, and/or make use of other types of communication services. For example, a UE device may use enhanced Mobile Broadband (eMBB) services for Voice over Internet Protocol (VOIP) telephone calls and/or data sessions for accessing Internet websites, use massive Internet of Things (IoT) communication as an IoT device, use Ultra-Reliable Low Latency Communication (URLLC) for mission critical low latency communication, etc. Each type of communication service may be associated with a different set of requirements.

In order to establish a communication session, a UE device may establish a Protocol Data Unit (PDU) session in the core network via the RAN. The UE device may then establish one or more data flows in the PDU session. Each data flow may be associated with a Quality of Service (QOS) and/or other types of service requirements.

A RAN intelligent controller (RIC) may manage PDU sessions and/or data flows in the RAN. The RIC may be configured for performance management, configuration management, and fault management of PDU sessions and/or data flows in the RAN. However, parameters outside the RAN may affect the performance of PDU sessions and/or data flows in the RAN. For example, the connection in the RAN from a wireless transceiver to the core network may be implemented using a transport network. A transport network may include devices and links that connect wireless transceivers of a RAN to a core network. Parameters associated with the transport network may affect the performance of the RAN. Furthermore, parameters associated with the core network may also affect the performance of the RAN.

Implementations described herein relate to systems and methods for traffic steering in a RAN based on transport network and core network information. A RIC may perform traffic steering in a RAN based on key performance indicator (KPI) data for a transport network used by the RAN, and/or based on KPI data for a core network connected to the RAN. In some implementations, a central RIC may be in communication with local real-time (RT) RICs associated with gNodeBs. The central RIC may obtain KPI data for the transport network and KPI data for the core network and provide the obtained KPI data to local RT RICs for RT traffic steering. In other implementations, a local RT RIC may obtain KPI data for the transport network and KPI data for the core network directly and perform traffic steering based on the obtained KPI information.

A device implementing a RIC may receive a request to establish a communication session or data flow for a UE device connected to the RAN, obtain information relating to KPIs for paths in the transport network used by the RAN to connect to the core network, and determine a KPI requirement for the communication session or data flow to be established. The device may then determine whether the KPI requirement may be satisfied based on the obtained KPI information. If it is determined that the KPI requirement cannot be satisfied, the request for the communication session or data flow may be rejected and the communication session or data flow may not be established. If it is determined that the KPI requirement cannot be satisfied, the device may select a path in the transport network based on the obtained KPI information and the determined KPI requirement, and establish the communication session or data flow in the transport network using the selected path.

Furthermore, selecting the path may include steering the communication session or data flow from a particular device or link in the transport network based on the obtained KPI information. For example, a path experiencing a latency higher than a first threshold latency value may be excluded from consideration when selecting paths for a communication session or data flow associated with a latency requirement below a second threshold latency value.

The device may be further configured to obtain core KPI information relating to KPIs for paths in the core network and select a path in the core network based on the obtained core KPI information and the determined KPI requirement. The core KPI information may be received, for example, from a Network Data Analytics Function (NWDAF) in the core network.

The KPI information may include, for example, a latency KPI parameter, a packet loss KPI parameter, a jitter KPI parameter, a throughput KPI parameter, and/or another type of KPI parameter. The KPI information for the transport network may include KPI values for a midhaul link in the transport network, a backhaul link in the transport network, a Centralized Unit User Plane (CU-UP) function in the transport network, a Distributed Unit (DU) in the transport network, a switch in the transport network, and/or another type of link or device in the transport network. Selecting the path in the transport network may include selecting a midhaul link, a backhaul link, a CU-UP function, a DU, a switch, and/or another type of link or device in the transport network.

Furthermore, the device implementing the RIC may scale KPI measurements based on KPI requirements. For example, different latency requirements may require different testing frequencies to determine whether a KPI requirement may be satisfied or to select a path in a transport network. Thus, a device implementing a RIC may be configured to determine a testing frequency for a KPI based on KPI requirements associated with UE devices connected to the RAN and obtain KPI information relating to the KPI for paths in the transport network based on the determined testing frequency. Additionally, in some implementations, a test to determine KPI values for a KPI parameter may be performed for paths in the transport network in response to receiving a request to establish the communication session or data flow.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, MEC network 140 (which includes MEC devices 145), core network 150, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a Wi-Fi® access point, a fixed wireless access device, a smart television, etc.; a portable gaming system; a global positioning system (GPS) device; a home appliance device; a home monitoring device; and/or any other type of computer device with wireless communication capabilities. In some implementations, UE device 110 may communicate using machine-to-machine (M2M) communication, such as Machine Type Communication (MTC), and/or another type of M2M communication for IoT applications.

RAN 130 may include base stations 120. Base station 120 may be configured for one or more Radio Access Technology (RAT) types. For example, base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components that enable cellular wireless communication with UE devices 110. For example, base station 120 may include a radio frequency (RF) transceiver configured to communicate with UE devices 110 using a 5G NR air interface, a 4G LTE air interface, and/or using another type of cellular air interface. Base station 120 may enable UE device 110 to communicate with core network 150.

MEC network 140 may be associated with one or more base stations 120 and may provide MEC services for UE devices 110 attached to the base stations 120. MEC network 140 may be in proximity to base stations 120 from a geographic and network topology perspective, thus enabling low latency services to be provided to UE devices 110. As an example, MEC network 140 may be located on the same site as base station 120. As another example, MEC network 140 may be geographically closer to one of base stations 120 and reachable via fewer network hops and/or fewer switches, than other base stations 120.

MEC network 140 may include one or more MEC devices 145. MEC devices 145 may provide MEC services to UE devices 110. A MEC service may include, for example, a low-latency microservice associated with a particular application, such as, for example, a user authentication microservice, a navigation microservice, an online shopping microservice, a content delivery microservice, a gaming microservice, a virtual and/or augmented reality microservice, a health monitoring microservice, and/or another type of microservice. As another example, a MEC service may include a microservice associated with a virtualized network function (VNF) of core network 150. As yet another example, a MEC service may include a cloud computing service, such as cache storage service, artificial intelligence (AI) accelerator service, machine learning service, an image process service, a data compression service, a locally centralized gaming service, a Graphics Processing Units (GPUs) and/or other types of hardware accelerator service, and/or other types of cloud computing services. As yet another example, MEC device 145 may host a RIC that manages RAN 130.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 5G core network. Exemplary components of a 5G core network are described below with reference to FIG. 2. In other implementations, core network 150 may include a 4G core network (e.g., an evolved packet core (EPC) network) and/or another type of core network.

The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a virtual network function (VNF) virtual machine, a Cloud Native Function (CNF) container, an event driven serverless architecture interface, and/or another type of SDN component. The common shared physical infrastructure may be implemented using one or more devices 400 described below with reference to FIG. 4 in a cloud computing center associated with core network 150. Additionally, or alternatively, some, or all, of the shared physical infrastructure may be implemented using one or more devices 400 implemented in MEC device 145 in MEC network 140.

Core network may include a service management and orchestration (SMO) platform 155. SMO platform 155 may oversee the orchestration, management, and/or automation of the components of RAN 130. SMO platform 155 may include a centralized RIC that includes RT and non-RT components to communicate with local RICs associated with base stations 120. The centralized RIC may collect KPI data, including transport KPI data for a transport network associated with RAN 130, and/or core KPI data associated with core network 150, and provide the collected transport KPI and core KPI data to the local RICs associated with base stations 120.

PDNs 160-A to 160-Y may each include a PDN. A particular PDN 160 may be associated with a Data Network Name (DNN) in 5G, and/or an Access Point Name (APN) in 4G. A UE device may request a connection to PDN 160 using a DNN or an APN. PDN 160 may include, and/or be connected to, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

PDN 160 may include an application server 170 (shown in PDN 160-A in FIG. 1 for illustrative purposes). Application server 170 may provide services for an application running on UE device 110 and may establish an application session with UE device 10 via RAN 130 and core network 150. RAN 130 and core network 150 may establish a communication session or data flow between UE device 110 and application server 170 and maintain a service requirement associated with the communication session or data flow.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
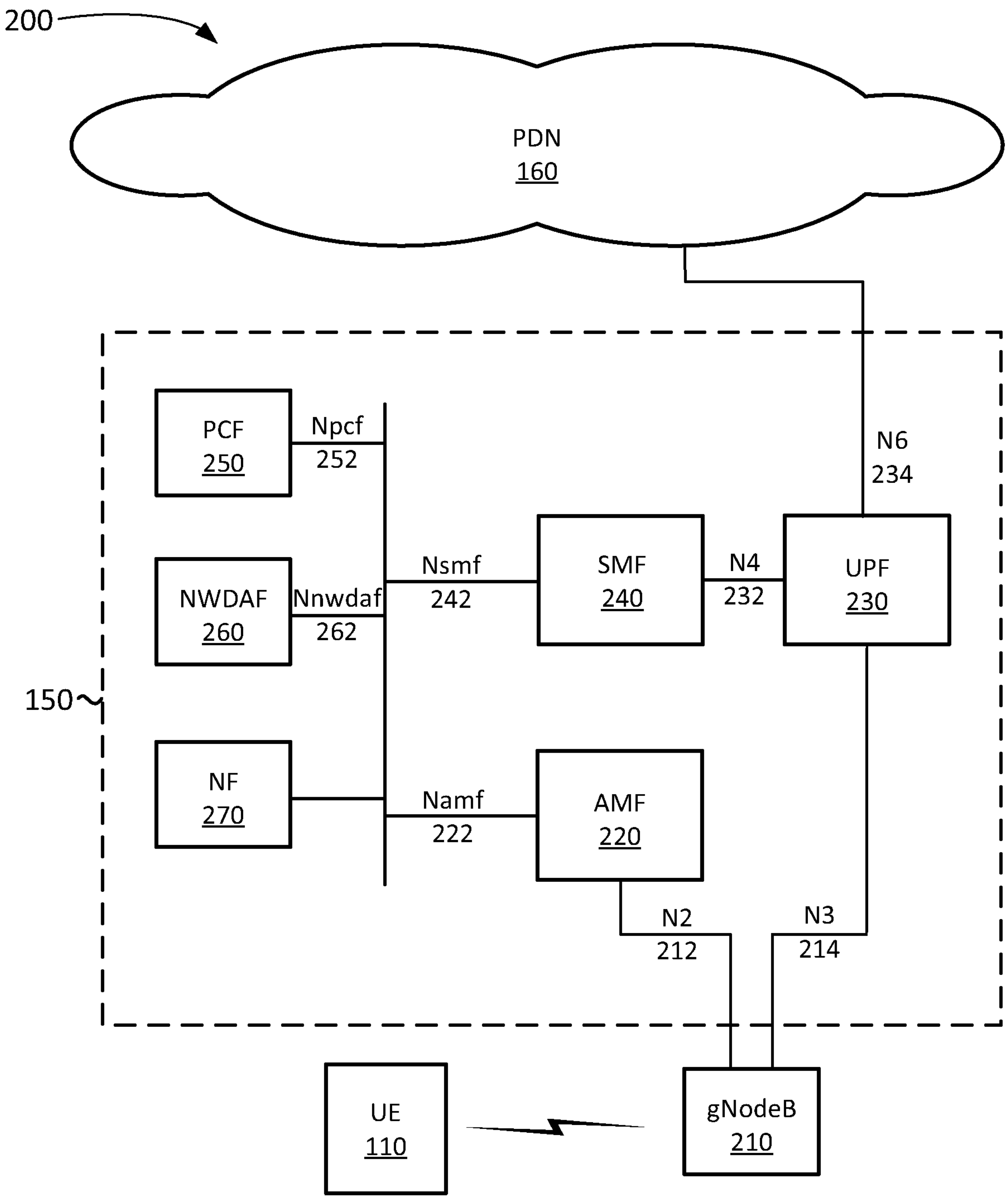
FIG. 2 is a diagram illustrating exemplary components of a Fifth Generation (5G) core network according to an implementation described herein.

FIG. 2 illustrates a system 200 that includes exemplary components of core network 150 and RAN 130 in the context of environment 100 according to an implementation described herein. As shown in FIG. 2, system 200 may include UE device 110, a gNodeB 210, core network 150, and PDN 160.

gNodeB 210 may include devices (e.g., base station 120) and components that enable UE device 110 to connect to core network 150 via RAN 130 using 5G NR RAT. For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214. gNodeB 210 may include a RIC that performs traffic steering based on KPI information associated with a transport network and/or core network 150.

Core network 150 may include an Access and Mobility Function (AMF) 220, a User Plane Function (UPF) 230, a Session Management Function (SMF) 240, a Policy Control Function (PCF) 250, a Network Data Analytics Function (NWDAF) 260, and one or more additional network functions (NFs) 270. While FIG. 2 depicts a single AMF 220, UPF 230, SMF 240, PCF 250, NWDAF 260, and NF 270, for illustrative purposes, in practice, core network 150 may include multiple AMFs 220, UPFs 230, SMFs 240, PCFs 250, NWDAFs 260, and/or NFs 20.

AMF 220 may perform registration management, connection management, reachability management, mobility management, lawful intercepts, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external PDU point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a gNodeB, and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, perform lawful intercepts, charge data collection, support charging interfaces, control and coordinate charging data collection, terminate session management parts of Non-Access Stratum (NAS) messages, perform downlink data notification, manage roaming, and/or perform other types of control plane processes for managing user plane data. SMF 240 may be accessible via an Nsmf interface 242.

PCF 250 may support policies to control network behavior, provide policy rules to control plane functions (e.g., to SMF 240), access subscription information relevant to policy decisions, perform policy decisions, and/or perform other types of processes associated with policy enforcement. PCF 250 may be accessible via an Npcf interface 252.

NWDAF 260 may collect analytics information associated with RAN 130 and/or core network 150. For example, NWDAF 260 may collect accessibility KPIs (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs. NWDAF 260 may be accessible via an Nnwdaf interface 262.

NF 270 may include an Application Function (AF) configured to provide services associated with a particular application; a Unified Data Management (UDM) configured to maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, and/or perform other processes associated with managing user data; a Charging Function (CHF) configured to perform charging and/or billing functions for core network 150; a Network Repository Function (NRF) configured to support a service discovery function and maintain profiles of available NF instances and their supported services; a Network Exposure Function (NEF) configured to expose capabilities and events to other NFs, including third party NFs, AFs, edge computing NFs, and/or other types of NFs; a Network Slice Selection Function (NSSF) configured to select a set of network slice instances to serve a particular UE device 110, determine network slice selection assistance information (NSSAI) or a Single-NSSAI (S-NSSA), determine a particular AMF 220 to serve a particular UE device 110, and/or perform other types of processing associated with network slice selection or management; an Authentication Server Function (AUSF) configured to perform authentication by, for example, implementing an Extensible Authentication Protocol (EAP) authentication server and storing authentication keys for UE devices 110; a 5G Equipment Identity Register (EIR) configured to authenticate a particular UE device 110 based on UE device identity, such as a Permanent Equipment Identifier (PEI); a Non-3GPP Inter-Working Function (N3IWF) configured to interconnect to a non-3GPP access device, such as, for example, a Wi-Fi® Access Point; and/or other types of 5G NFs.

Although FIG. 2 shows exemplary components of system 200, in other implementations, system 200 may include fewer components, different components, differently arranged components, or additional components than depicted in FIG. 2. Additionally, or alternatively, one or more components of system 200 may perform functions described as being performed by one or more other components of system 200.

Figure 3:
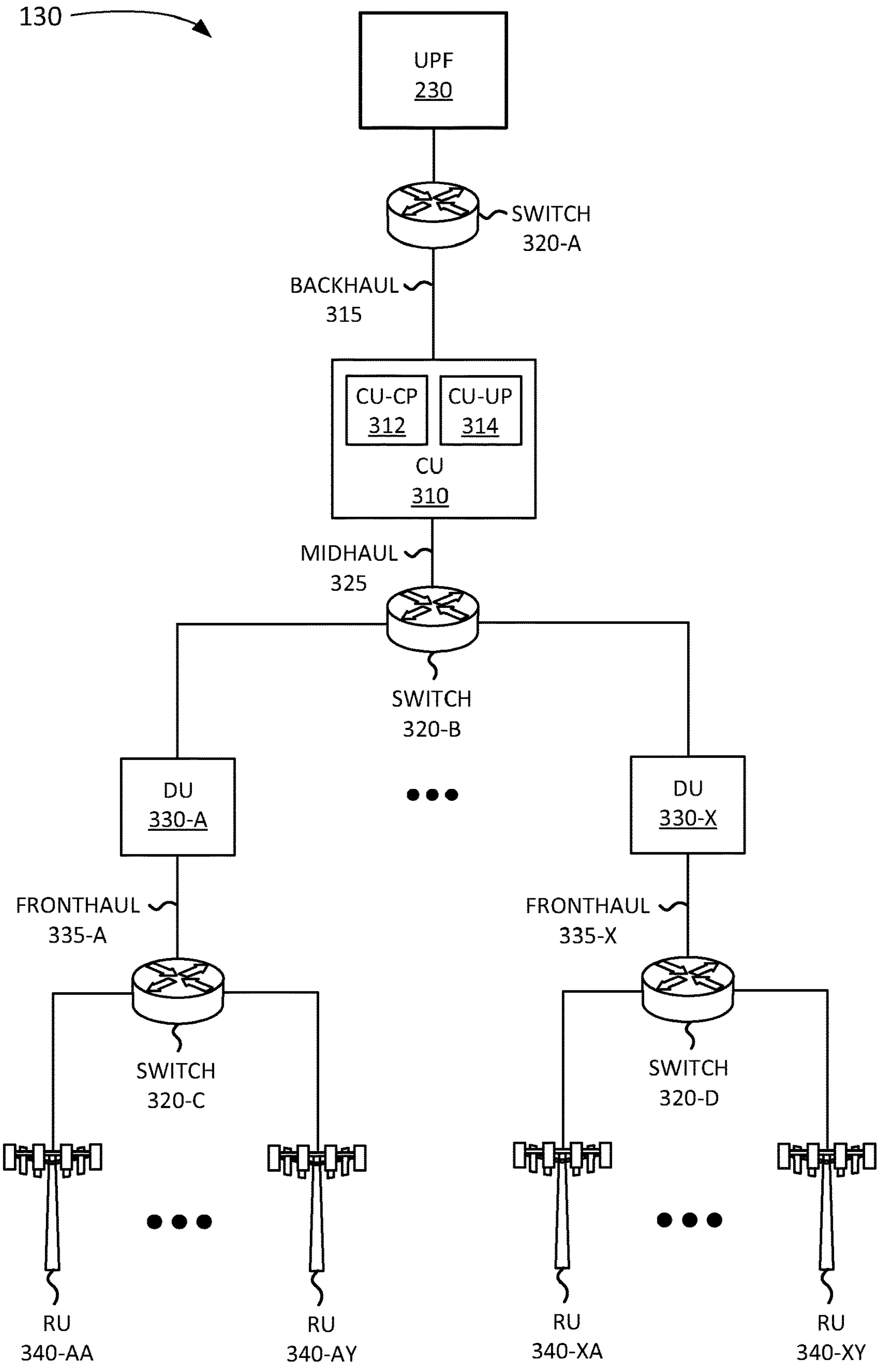
FIG. 3 illustrates exemplary components of a Radio Access Network (RAN) according to an implementation described herein.

FIG. 3 illustrates exemplary components of RAN 130 according to an implementation described herein. As shown in FIG. 3, RAN 130 may include a CU 310, switches 320A, 320-B, 320-C, and 320-D (referred to herein collectively as "switches 320" and individually as "switch 320"), DU 330-A to 330-X (referred to herein collectively as "DUs 330" and individually as "DU 330"), and RUs 340-AA to 340-XY (referred to herein collectively as "RUs 340" and individually as "RU 340"). The components of RAN 130 may satisfy the requirements set forth by the 3$^{rd}$ Generation Partnership Project (3GPP). Furthermore, in some implementations, the components of RAN 130 may additionally satisfy the standardized architecture requirements of the Open RAN (O-RAN) Alliance to enable the components of RAN 130 from different supplies to be compatible and operate together.

CU 310 may include a logical node that includes the functionality for control flow processing for gNodeB 210, including, for example, the functionality to generate and/or process Radio Resource Control (RRC) protocol messages, Service Data Adaptation Protocol (SDAP) messages, and/or Packet Data Convergence Protocol (PDCP) messages. CU 310 may include CU-CP 312 and CU-UP 314. CU-CP 312 may perform control plane processing for CU 310 and may control one or more DUs 330. Furthermore, in some implementations, CU-CP 312 may include a real-time RIC that performs traffic steering based on KPI information associated with RAN 130 and/or core network 150. CU-UP 314 may perform data plane processing for CU 310, such as forwarding and/or routing messages between DU 330 and core network 130 (e.g., UPF 230). CU-CP 312 may set up PDU sessions in DU 330 and CU-UP 314. CU 310 may terminate an F1 interface with DU 330 and an N3 interface with UPF 230. Furthermore, while FIG. 3 shows UPF 230 connected to CU 310 via backhaul 315, in other implementations UPF 230 may be co-located with CU-UP 314. CU-UP 314 may report KPI information about its performance to SMO platform 155 and/or to a real-time RIC in CU-CP 312, in MEC device 145, and/or in another location.

Switches 320 may perform switching and/or routing in RAN 130. For example, switch 320-A may perform routing along backhaul 315 from CU 310 to UPF 230, switch 320-B may perform switching and/or routing along midhaul 325 between DUs 330-A to 330-X and CU 310, switch 320-C may perform switching along fronthaul 335-A between RUs 340-AA to 340-AY and DU 330-A, and switch 320-D may perform switching along fronthaul 335-X between RUs 340-XA to 340-XY and DU 330-X. While a single switch 320 is shown for backhaul 315, midhaul 325, fronthaul 335-A, and fronthaul 335-X for illustrative purposes, in practice each of backhaul 315, midhaul 325, fronthaul 335-A, and fronthaul 335-X may include multiple switches 320. In some implementations, switch 320 may report KPI information about its performance to SMO platform 155 and/or to a real-time RIC in CU-CP 312, in MEC device 145, and/or in another location. Switches 320, fronthaul 335, midhaul 325, backhaul 315, and CU-UP 314 may be considered part of the transport network that enables RAN 130 to connect to core network 150.

DU 330 may include a logical node that includes lower level functionality for processing (e.g., Layer 2 and/or Layer 1 processing) for gNodeB 210, including, for example, functionality to generate and/or process Radio Link Control (RLC) messages, Media Access Control (MAC) messages, and/or physical (PHY) layer messages. DU 330 may support multiple RUs 340. RU 340 may include an RF transceiver with one or more antenna arrays. In some implementations, RU 340 and DU 330 may be collocated and/or implemented in the same device. Furthermore, in some implementations, DU 330 may report KPI information about its performance to SMO platform 155 and/or to a real-time RIC in CU-CP 312, in MEC device 145, and/or in another location.

Although FIG. 3 shows exemplary components of RAN 130, in other implementations, RAN 130 may include fewer components, different components, differently arranged components, or additional components than depicted in FIG. 3.

Figure 4:
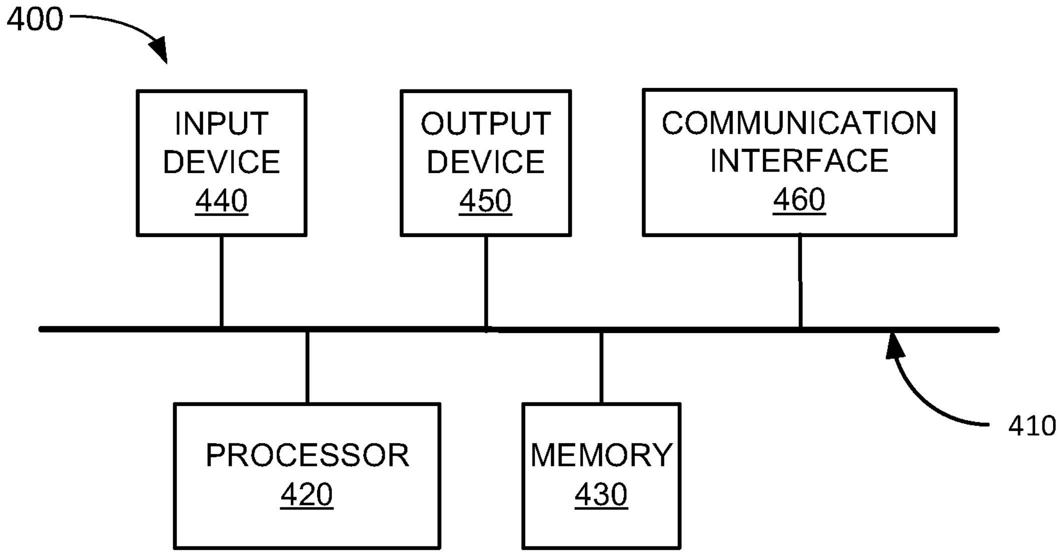
FIG. 4 illustrates exemplary components of a device that may be included in a component of an environment according to an implementation described herein.

FIG. 4 illustrates example components of a device 400 according to an implementation described herein. UE device 110, base station 20, MEC device 145, SMO platform 155, application server 170, gNodeB 210, AMF 220, UPF 230, SMF 240, PCF 250, NWDAF 260, AF 270, CU-CP 312, CU-UP 314, switch 320, DU 330, RU 340, and/or other components of core network 150 or RAN 130, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, central processing unit (CPU), and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. Additionally, or alternatively, processor 420 may include a hardware accelerator integrated circuit or processing logic, such as a graphics processing unit (GPU), a tensor processing unit (TPU), and/or another type of hardware accelerator.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to RF signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to traffic steering in a RAN based on KPI information associated with a transport network and/or core network. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
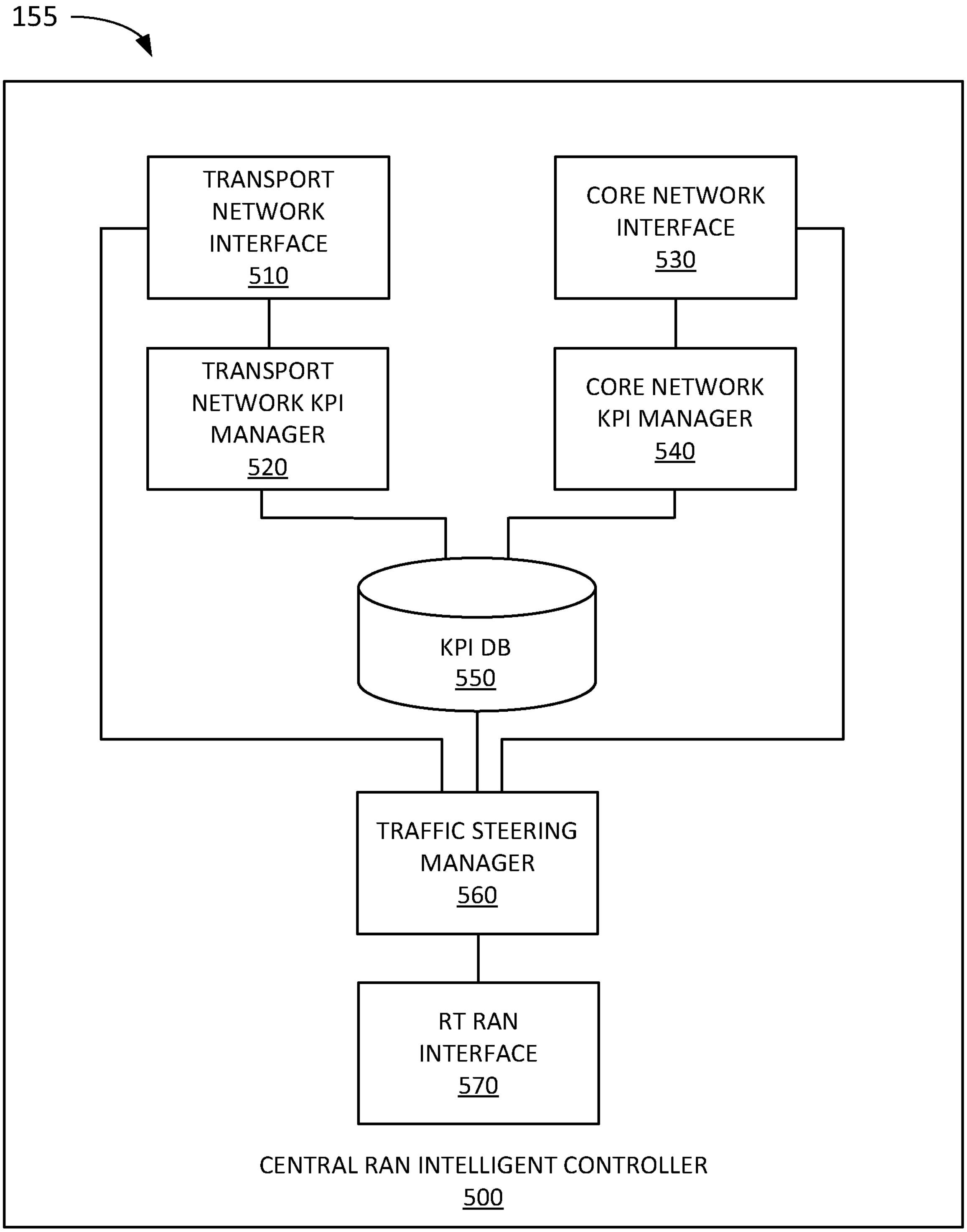
FIG. 5 illustrates exemplary components of a centralized RAN Intelligent Controller (RIC) according to an implementation described herein.

FIG. 5 is a diagram illustrating exemplary components of a central RIC 500 in SMO platform 155. The components of central RIC 500 may be implemented, for example, via processor 420 executing instructions from memory 430. Alternatively, some or all of the components of central RIC 500 may be implemented via hard-wired circuitry. As shown in FIG. 5, central RIC 500 may include a transport network interface 510, a transport network KPI manager 520, a core network interface 530, a core network KPI manager 540, a KPI database (DB) 550, a traffic steering manager 560, and a RT RAN interface 570.

Transport network interface 510 may be configured to communicate with a transport network associated with RAN 130 to obtain KPI values associated with the transport network. For example, KPI values for the transport network may be collected by CU-CP 312, a switch controller (not shown in FIG. 3) that controls switches 320, and/or another component in RAN 130 and provided to transport network interface 510. Transport network KPI manager 520 may collect the obtained transport KPI information, format and organize the collected transport KPI information, and store the transport KPI information in KPI DB 550. Furthermore, transport KPI manager 520 may set a particular frequency at which particular KPI parameters are measured in particular components in RAN 130 and send an instruction to RAN 130 to obtain KPI value measurements at the particular frequency.

Core network interface 530 may be configured to communicate with core network 150 to obtain KPI values associated with core network 150. For example, KPI values for core network 150 may be obtained from NWDAF 260 at particular intervals. Core network KPI manager 540 may collect the obtained core KPI information, format and organize the collected core KPI information, and store the transport KPI information in KPI DB 550. KPI DB 550 may store obtained transport KPI values and/or core KPI values. Exemplary information that may be stored in KPI DB 550 is described below with reference to FIG. 7.

Traffic steering manager 560 may manage traffic steering in RAN 130 by providing collected transport KPI information and/or core KPI information to RAN 130 via RT RAN interface 570. RT RAN interface 570 may be configured to communicate with an RT RIC associated with RAN 130 and implemented in a CU-CP 312, MEC device 145, and/or another component associated with RAN 130.

Although FIG. 5 shows exemplary components of central RIC 500, in other implementations, central RIC 500 may include fewer components, different components, additional components, or differently arranged components than depicted in FIG. 5. Additionally, or alternatively, one or more components of central RIC 500 may perform one or more tasks described as being performed by one or more other components of central RIC 500.

Figure 6:
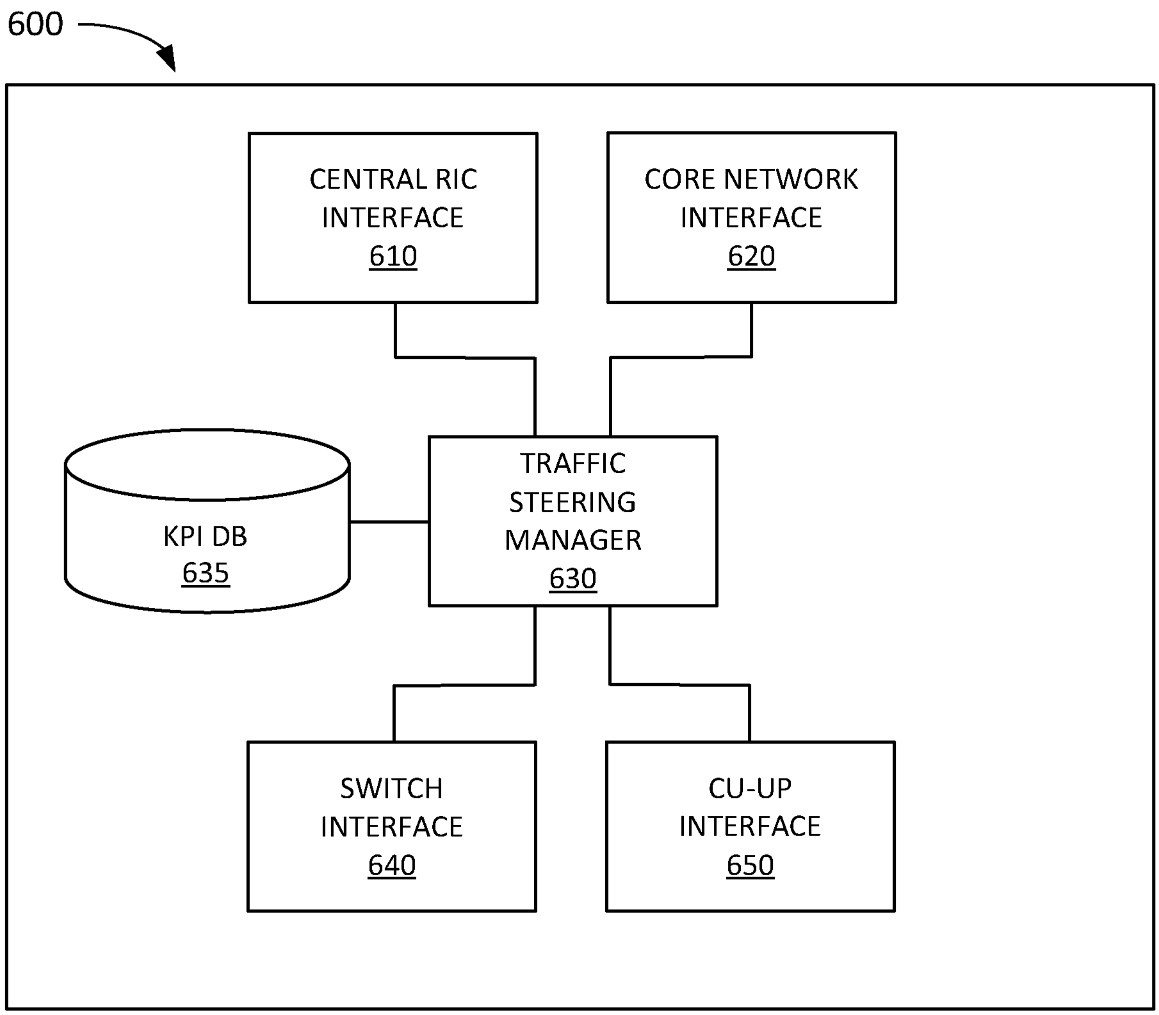
FIG. 6 illustrates exemplary components of a real-time RIC according to an implementation described herein.

FIG. 6 is a diagram illustrating exemplary components of an RT RIC 600 that may be included in RAN 130. In some implementations, RT RIC 600 may be implemented in CU-CP 312. In other implementations, RT RIC 600 may be implemented in MEC device 145. In yet other implementations, RT RIC 600 may be implemented by another component of RAN 130. The components of RAN controller 600 may be implemented, for example, via processor 420 executing instructions from memory 430. Alternatively, some or all of the components of RAN controller 600 may be implemented via hard-wired circuitry. As shown in FIG. 6, RAN controller 600 may include a central RIC interface 610, a core network interface 620, a traffic steering manager 630, a KPI DB 635, a switch interface 640, and a CU-UP interface 650.

Central RIC interface 610 may be configured to communicate with central RIC 500. For example, central RIC interface 610 may obtain transport network KPI values and/or core network KPI values from central RIC 500 and provide the obtained KPI values to traffic steering manager 630 to store in KP DB 635.

Core network interface 620 may be configured to communicate with core network 150. For example, core network interface 620 may use N2 interface 212 to communicate with AMF 220. Core network interface 620 may receive a request from AMF 220 to establish a PDU session in RAN 130 and/or to create a data flow in the PDU session. Furthermore, in some implementations, core network interface 620 may send information back to core network 150 regarding a selected path associated with core network 150. For example, traffic steering manager 630 may select backhaul 315 and/or UPF 230 that is able to satisfy the KPI requirements of a data flow and core network 150 may update a selection of UPF 230 for the data flow based on information received from RT RIC 600.

Traffic steering manager 630 may store KPI information obtained from Central RIC interface 610 in KPI DB 635. Exemplary information that may be stored in KPI DB 635 is described below with reference to FIG. 7. Traffic steering manager 630 may perform traffic steering in RAN based on transport network KPI information and/or core network KPI information stored in KPI DB 635, and KPI requirements associated with a PDU communication sessions and/or data flows.

For example, traffic steering manager 630 may select a path from KPI DB 635 that is associated with a lower latency than a latency requirement for a requested data flow. If multiple paths satisfy the KPI requirements, traffic steering manager 630 may select a path with the highest capacity and/or lowest load. Furthermore, traffic steering manager 630 may steer the data flow away from a particular path. For example, a path experiencing a latency higher than a threshold latency value may be excluded from consideration when selecting paths for the data flow.

Traffic steering manager 630 may program devices in the selected path to switch/route PDUs associated with the data flow along links associated with the selected path. For example, traffic steering manager 630 may use switch interface 640 to program one or more switches 320 along the selected path. Furthermore, traffic steering manager 630 may use CU-UP interface 650 to program a selected CU-UP 314 switch/route PDUs associated with the data flow to UPF 230 associated with the data flow.

Although FIG. 6 shows exemplary components of RT RIC 600, in other implementations, RT RIC 600 may include fewer components, different components, additional components, or differently arranged components than depicted in FIG. 6. Additionally, or alternatively, one or more components of RT RIC 600 may perform one or more tasks described as being performed by one or more other components of RT RIC 600.

Figure 7:
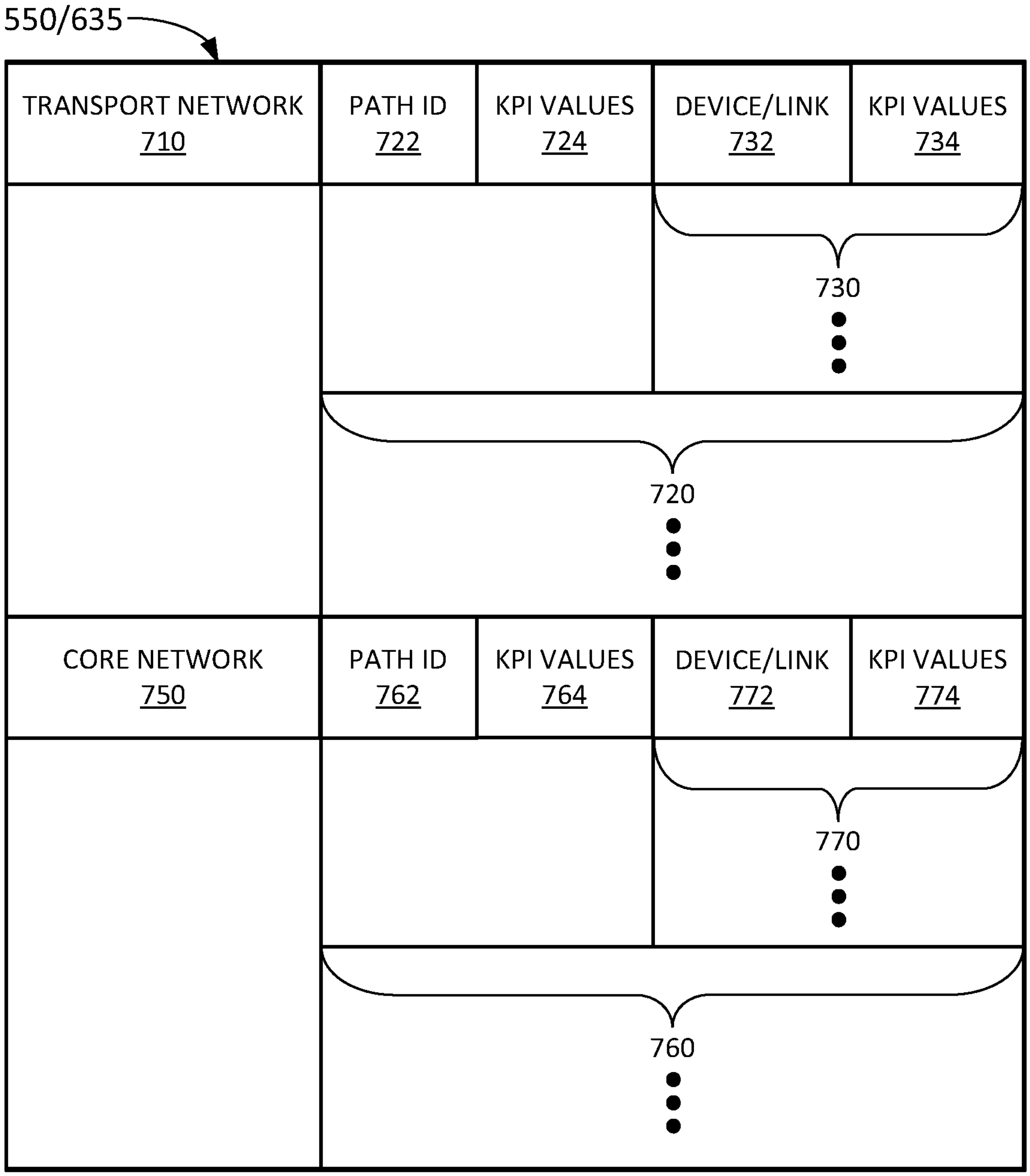
FIG. 7 illustrates exemplary components of a key performance indicator (KPI) database according to an implementation described herein.

FIG. 7 illustrates exemplary components of KPI DB 530 or KPI DB 635 according to an implementation described herein. As shown in FIG. 7, KPI DB 530 or KPI DB 635 may include one or more switch records 700. Each switch record 700 may store information associated with a particular switch 320. Switch record 700 may include a transport network field 710 identifying one or more transport network path records 720 and a core network field 720 identifying one or more core network path records 760.

Each transport network path record 720 may store information associated with a particular path in the transport network associated with RAN 130. Transport network path record 720 may include a path identifier (ID) field 722, a KPI values field 724, and one or more device/link records 730. Path ID field 722 may identify a particular path in the transport network associated with RAN 130. KPI values field 724 may store current, or most recently determined, KPI values associated with the particular path. Each device/link record 730 may store information for a device or link associated with the particular path. Device/link record 730 may include a device/link field 732 and a KPI values field 734.

Device/link record 730 may store information identifying a particular device or link in the particular path. For example, device/link record 730 may identify a particular CU-UP 314, midhaul 325, switch 325, DU 330, fronthaul 335, and/or another type of device or link in a transport network used by RAN 130. KPI values field 734 may store current, or most recently determined, KPI values associated with the particular device/link. For example, KPI values field 734 may store a latency value, a packet loss value, a jitter value, a throughput value, and/or values for other types of KPI parameters that may be used for traffic steering. The values stored in KPI values field 734 for the individual devices/links in the path may be used to determine the KPI values for the entire path stored in KPI values field 724. As an example, a path latency may be calculated as a sum of the latencies of devices and links that comprise the path. As another example, a path packet loss rate may be based on an average packet loss rate based on the packet loss rates of devices and links that comprise the path. Similarly, a path jitter rate may be based on the highest jitter rate in the jitter rates of devices and links that comprise the path. As yet another example, a path throughput may be based on the lowest throughput value in the throughput values of devices and links that comprise the path.

Each core network path record 760 may store information associated with a particular path in core network 150. Core network path record 760 may include a path identifier (ID) field 762, a KPI values field 764, and one or more device/link fields 770. Device/link record 770 may store information identifying a particular device or link in the particular path. For example, device/link record 770 may identify a particular backhaul 315, switch 320, UPF 230, and/or another type of device or link in the data plane of core network 150. KPI values field 774 may store current, or most recently determined, KPI values associated with the particular device/link. For example, KPI values field 774 may store a latency value, a packet loss value, a jitter value, a throughput value, and/or values for other types of KPI parameters that may be used for traffic steering. The values stored in KPI values field 774 may be used to determine the KPI values for the path stored in KPI values field 764, similarly to as described above with respect to KPI values field 724 and KPI values field 734.

Although FIG. 7 shows exemplary components of KPI DB 530 or KPI DB 635, in other implementations, KPI DB 530 or KPI DB 635 may include fewer components, different components, additional components, or differently arranged components than depicted in FIG. 7.

Figure 8:
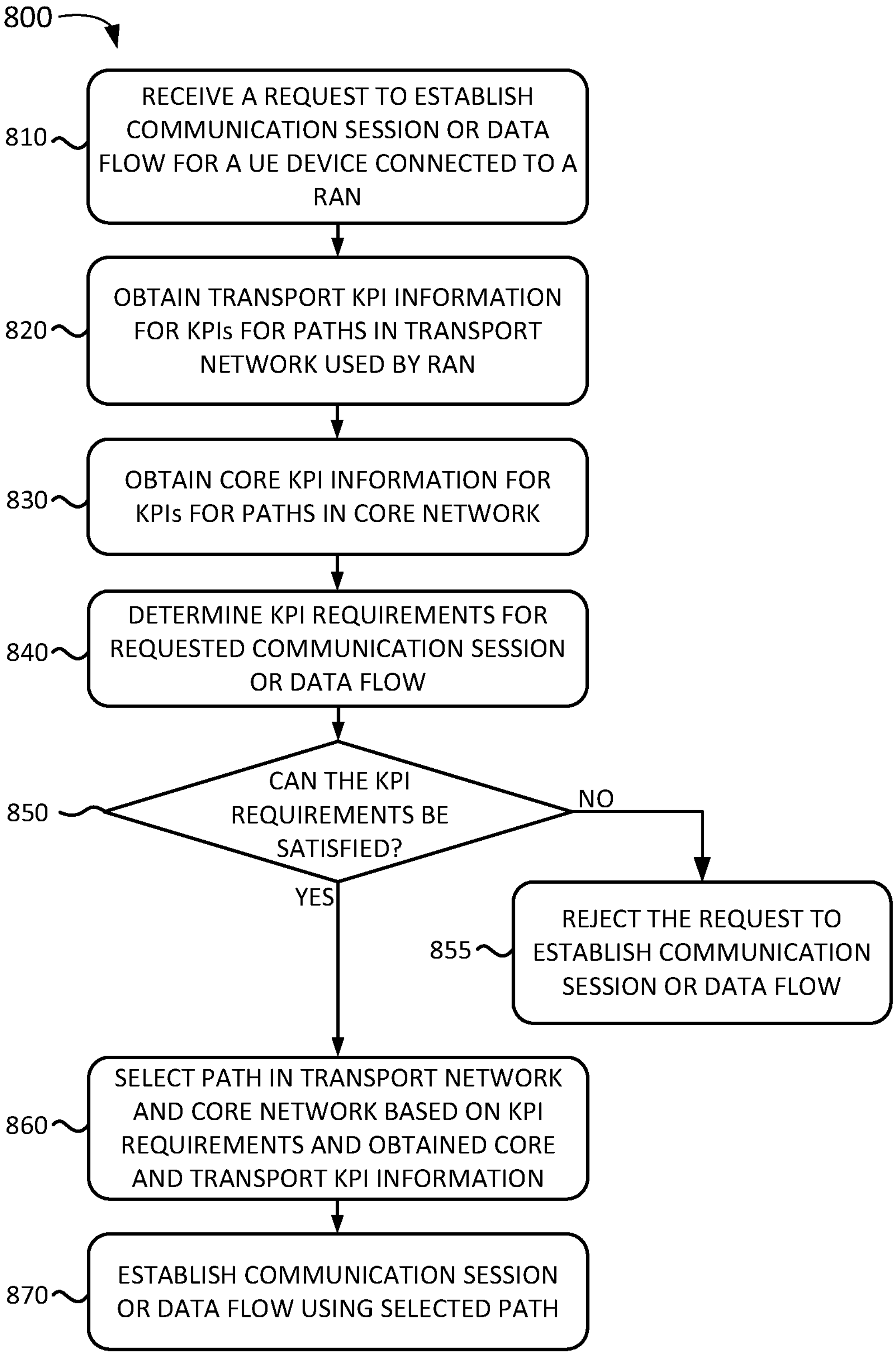
FIG. 8 illustrates a flowchart for using transport network and core network KPI data to establish a communication session or data flow according to an implementation described herein.

FIG. 8 illustrates a flowchart for using transport network and core network KPI data to establish a communication session or data flow according to an implementation described herein. In some implementations, process 800 of FIG. 8 may be performed by RT RIC 600 and/or by central RIC 500. In other implementations, some or all of process 800 may be performed by another device or a group of devices.

As shown in FIG. 8, process 800 may include receiving a request to establish a communication session or data flow for a UE device connected to a RAN (block 810). For example, UE device 110 may request to establish a PDU session and/or to create a data flow in a PDU session. AMF 220 in core network 150 may then send a request to RT RIC 600 to implement the PDU session and/or data flow in the transport network associated with RAN 130.

Process 800 may further include obtaining transport KPI information for KPIs for paths in the transport network used by the RAN (block 820) and obtaining core KPI information for KPIs for paths in the core network (block 830). For example, RT RIC 600 may receive transport network KPI information and/or core network KPI information from SMO platform 155 and store the information in KPI DB 635.

Process 800 may further include determining KPI requirements for the requested communication session or data flow (block 840). For example, the data flow request may include information identifying a KPI requirement, such as, for example, a latency requirement, a packet loss rate requirement, a jitter requirement, a throughput requirement, a security requirement, an error rate requirement, a packet delivery rate requirement, and/or another type of KPI requirement.

A determination may be made as to whether the KPI requirements can be satisfied (block 850). For example, RT RIC 600 may determine whether the determined KPI requirements can be satisfied by the paths for which KPI data is stored in KPI DB 635. If it is determined that the KPI requirements cannot be satisfied (block 850—NO), the request to establish a communication session or data flow may be rejected. For example, RT RIC 600 may send a message to AMF 220 and/or to UE 110, indicating that the data flow has been rejected. Rejecting the data flow when the KPI requirements cannot be satisfied may conserve the resources of RAN 130.

Furthermore, in some implementations, RT RIC 600 may disable a network slice in RAN if RT RAN 600 determines that requirements associated with the network slice cannot be satisfied. A "network slice," may encompass an end-to-end virtual network, with dedicated storage and/or computation resources, be configured to implement a particular set of requirements. For example, a URLLC network slice may be associated with an ultra-low latency requirement (e.g., less than 1 millisecond) and RT RIC 600 may determine that no available paths are able to guarantee the ultra-low latency requirement. In response, RIC RAN 600 may disable the URLLC network slice in RAN 130, to conserve network resources, until the ultra-low latency requirement can be satisfied.

If it is determined that the KPI requirements can be satisfied (block 850—YES), a path in the transport network and core network may be selected based on the KPI requirements and the obtained core KPI and transport KPI information (block 860), and the communication session or data path may be established using the selected path (block 870). For example, RT RIC 600 may select a path from KPI DB 635 that is associated with a lower latency than a latency requirement for the requested data flow. In some implementations, RT RIC 600 may select the path with the lowest latency. In other implementations, if multiple paths are available that satisfy the KPI requirements, RT RIC 600 may select a path with the highest capacity and/or lowest load. Furthermore, RT RIC 600 may steer the data flow away from a particular path. For example, a path experiencing a latency higher than a threshold latency value may be excluded from consideration when selecting paths for the data flow.

During establishment of a PDU session, when UE device 110 performs a registration procedure with core network 150, core network 150 may perform a PDU establishment procedure. UE device 110 may send a Radio Resource Control (RRC) PDU session establishment request to AMF 220 via gNodeB 210 to establish a PDU session. AMF 220 may send a Create Context Request to SMF 240. SMF 240 may obtain subscriber information from a UDM, obtain policies for the PDU session from a PCF, select UPF 230, send a PDU session establishment message to UPF 230, receive a PDU session establishment response from UPF 230, and send a response back to AMF 220 indicating that the PDU session has been established. AMF 220 may send a PDU session response back to UE device 110 via gNodeB 210. As part of the PDU session establishment, a default data flow may be created in the PDU session (e.g., in the GTP tunnel established for the PDU session) using a PDU Session Modification procedure.

Additionally, UE device 110 may request an additional data flow (e.g., when a user activates an application on UE device 110, etc.). UE device 110 may send the data flow request to core network 150 (e.g., by sending a request to core network 150 via an NEF interface, an AF interface, and/or another type of interface available to UE device 110). Alternatively, a data flow may be created by core network 150 using application data associated with UE device 110 (e.g., based on an application ID associated with an application session request sent by UE device 110), and/or based on another type of request to establish a data flow in a PDU session. The data flow request may be associated with a KPI requirement based on, for example, a QoS class associated with the data flow. The KPI requirement may include a latency requirement, a packet loss rate requirement, a jitter requirement, a throughput requirement, a security requirement, an error rate requirement, a packet delivery rate requirement, and/or another type of KPI requirement.

Core network 150 (e.g., AMF 220) may then assign a Traffic Flow Template (TFT) to the data flow and send the TFT to UE device 110. For example, the TFT may include a tuple, such as a 5-tuple that includes a source IP address, a source port, a destination IP address, a destination port, and a protocol, associated with the created data flow. UE device 110 may use the TFT to assign data packets to the data flow.

Additionally, core network 150 (e.g., AMF 220) may send an instruction to RAN 130 (e.g., RT RIC 600 in CU-CP 312, in MEC device 145, etc.) to implement transport of the data flow from UE device 110 to core network 150 via RAN 130 and the transport network associated with RAN 130. RT RIC 600 may select a path in the transport network as described above by, for example, selecting midhaul 325 and CU-UP 314. Furthermore, RT RIC 600 may select one or more switches 320. RT RIC 600 may then configure the selected CU-UP 314 and/or switches to implement the routing/forwarding of the PDUs of the data flow using the TFT, while satisfying the KPI requirements associated with the data flow.

Furthermore, RT RIC 600 may send information back to core network 150 regarding a selected path associated with core network 150. For example, RT RIC 600 may select backhaul 315 and/or UPF 230 that is able to satisfy the KPI requirements of the data flow. Core network 150 may update a selection of UPF 230 for the data flow based on information received from RT RIC 600. For example, if another UPF 230 than a currently selected UPF 230 is better able to manage the data flow, as determined by RT RIC 600, core network 150 (e.g., SMF 240) may select the other UPF 230 for the data flow.

Figure 9:
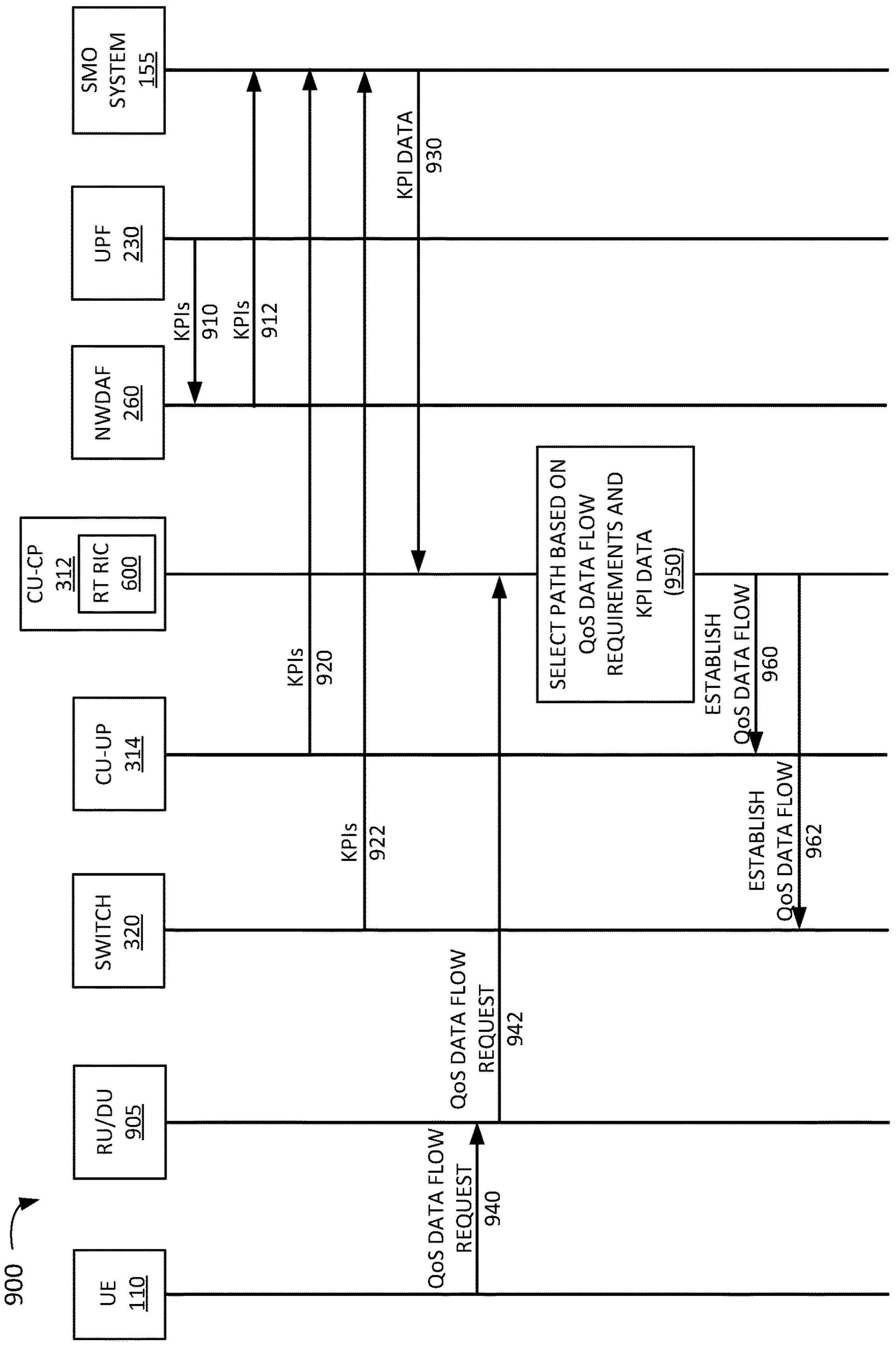
FIG. 9 illustrates an exemplary signal flow according to an implementation described herein.

FIG. 9 illustrates an exemplary signal flow 900 according to an implementation described herein. Assume a PDU session for UE device 110 has already been established. As shown in FIG. 9, signal flow 900 may include UPF 230 sending KPI data (e.g., latency, packet loss rate, jitter, throughput, etc.) to NWDAF 260 and NWDAF 260 forwarding the KPI information to SMO platform 155 (signals 910 and 912). Additionally, switch 320 and CU-UP 314 may report KPI data to SMO system 155, either directly, or via other devices, such as a switch controller associated with switch 320, CU-CP 312, etc. (signals 920 and 922). SMO platform 155 may provide updated KPI data to RT RIC 600 in CU-CP 312 (signal 930).

At a later time, UE 110 may request a QoS data flow (signal 940) via RU/DU 905 (signal 940). RT RIC 600 in CU-CP 312 may receive information associated with the QoS data flow (signal 942). While the QoS data flow request is shown as being sent from RU/DU 905 for simplicity, the QoS data flow request may be sent to AMF 220 (not shown in FIG. 9) and forwarded from AMF 220 to RT RIC 600 in CU-CP 312. RT RIC 600 in CU-CP 312 may select a path in the transport network associated with RAN 130 based on the obtained KPI information and KPI requirements associated with the QoS data flow (block 950). The selected path may include CU-UP 314 and switch 320. RT RIC 600 in CU-CP 312 may establish the QoS data flow in CU-UP 314 and switch 320 by configuring CU-UP 314 and switch 320 to route/forward PDUs associated with the TFT for the QoS data flow (signals 960 and 962).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 8, and a series of signals have been described with respect to FIG. 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

receiving, by a device, a request to establish a communication session or data flow for a user equipment (UE) device connected to a Radio Access Network (RAN);

obtaining, by the device in response to the request and prior to selecting a particular path in a transport network, key performance indicators (KPI) information relating to one or more KPIs for a plurality of paths in the transport network used by the RAN to connect to a core network;

determining, by the device, a KPI requirement for the communication session or data flow to be established;

selecting, by the device, the particular path in the transport network based on the obtained KPI information and the determined KPI requirement, wherein selecting the particular path includes excluding a path of the plurality of paths in the transport network from consideration when the obtained KPI information indicates that a latency for the path is higher than a first threshold latency value and the determined KPI requirement includes a latency requirement below a second threshold latency value; and establishing, by the device, the communication session or data flow in the transport network using the selected path.

2. The method of claim 1, further comprising:

obtaining, in response to the request and prior to selecting a particular path in the core network, core KPI information relating to the one or more KPIs for a plurality of paths in the core network; and selecting the particular path in the core network based on the obtained core KPI information and the determined KPI requirement.

3. The method of claim 2, wherein obtaining the core KPI information relating to the one or more KPIs for the plurality of paths in the core network includes:

receiving the core KPI information from a Network Data Analytics Function (NWDAF) in the core network.

4. The method of claim 1, further comprising:

receiving another request to establish another communication session or data flow for another UE device connected to the RAN;

determining a KPI requirement for the other communication session or data flow to be established;

determining that the KPI requirement for the other communication session cannot be satisfied by the transport network based on the obtained KPI information; and rejecting the other request to establish the other communication session or data flow for the other UE device, in response to determining that the KPI requirement for the other communication session cannot be satisfied by the transport network.

5. The method of claim 1, wherein obtaining KPI information relating to the one or more KPIs for the plurality of paths in the transport network includes:

obtaining KPI information for a midhaul link in the transport network.

6. The method of claim 1, wherein selecting the path in the transport network includes:

selecting a Centralized Unit User Plane (CU-UP) function in the transport network for the communication session or data flow.

7. The method of claim 1, wherein obtaining KPI information relating to the one or more KPIs for the plurality of paths in the transport network includes:

obtaining KPI information for one or more switches in the transport network; and wherein selecting the path in the transport network based on the obtained KPI information and the determined KPI requirement includes:

selecting at least one of the one or more switches.

8. The method of claim 1, wherein the device includes a RAN Intelligent Controller (RIC).

9. The method of claim 1, wherein the one or more KPIs include:

a latency parameter, a packet loss parameter, a jitter parameter, or a throughput parameter.

10. The method of claim 1, further comprising:

determining a testing frequency for the one or more KPIs based on KPI requirements associated with UE devices connected to the RAN; and obtaining the KPI information relating to the one or more KPIs for the plurality of paths in the transport network based on the determined testing frequency.

11. The method of claim 1, further comprising:

performing a test to obtain the KPI information relating to the one or more KPIs for the plurality of paths in the transport network in response to receiving the request to establish the communication session or data flow.

12. A device comprising:

a processor configured to:

receive a request to establish a communication session or data flow for a user equipment (UE) device connected to a Radio Access Network (RAN);

obtain, in response to the request and prior to selecting a particular path in a transport network, key performance indicators (KPI) information relating to one or more KPIs for a plurality of paths in the transport network used by the RAN to connect to a core network;

determine a KPI requirement for the communication session or data flow to be established;

select the particular path in the transport network based on the obtained KPI information and the determined KPI requirement, wherein the processor configured to select the particular path is further configured to exclude a path of the plurality of paths in the transport network from consideration when the obtained KPI information indicates that a latency for the path is higher than a first threshold latency value and the determined KPI requirement includes a latency requirement below a second threshold latency value; and establish the communication session or data flow in the transport network using the selected path.

13. The device of claim 12, wherein the processor is further configured to:

obtain, in response to the request and prior to selecting a particular path in the core network, core KPI information relating to the one or more KPIs for a plurality of paths in the core network; and select the particular path in the core network based on the obtained core KPI information and the determined KPI requirement.

14. The device of claim 12, wherein the processor is further configured to:

receive another request to establish another communication session or data flow for another UE device connected to the RAN;

determine a KPI requirement for the other communication session or data flow to be established;

determine that the KPI requirement for the other communication session cannot be satisfied by the transport network based on the obtained KPI information; and reject the other request to establish the other communication session or data flow for the other UE device, in response to determining that the KPI requirement for the other communication session cannot be satisfied by the transport network.

15. The device of claim 12, wherein, when obtaining KPI information relating to the one or more KPIs for the plurality of paths in the transport network, the processor is further configured to:

obtain KPI information for a midhaul link in the transport network.

16. The device of claim 12, wherein, when selecting the path in the transport network, the processor is further configured to:

select a Centralized Unit User Plane (CU-UP) function in the transport network for the communication session or data flow.

17. The device of claim 12, wherein, when obtaining KPI information relating to the one or more KPIs for the plurality of paths in the transport network, the processor is further configured to:

obtain KPI information for a switch in the transport network; and wherein, when selecting the path in the transport network based on the obtained KPI information and the determined KPI requirement, the processor is further configured to:

select the switch.

18. The device of claim 12, wherein the processor is further configured to:

determine a testing frequency for the one or more KPIs based on KPI requirements associated with UE devices connected to the RAN; and obtain the KPI information relating to the one or more KPIs for the plurality of paths in the transport network based on the determined testing frequency.

19. The device of claim 12, wherein the processor is further configured to:

perform a test to obtain the KPI information relating to the one or more KPIs for the plurality of paths in the transport network in response to receiving the request to establish the communication session or data flow.

20. A non-transitory computer-readable memory device storing instructions executable by a processor, the non-transitory computer-readable memory device comprising:

one or more instructions to receive a request to establish a communication session or data flow for a user equipment (UE) device connected to a Radio Access Network (RAN);

one or more instructions to obtain, in response to the request and prior to selecting a particular path in a transport network, key performance indicators (KPI) information relating to one or more KPIs for a plurality of paths in the transport network used by the RAN to connect to a core network;

one or more instructions to determine a KPI requirement for the communication session or data flow to be established;

one or more instructions to select the particular path in the transport network based on the obtained KPI information and the determined KPI requirement, wherein the one or more instructions to select the particular path include one or more instructions to exclude a path of the plurality of paths in the transport network from consideration when the obtained KPI information indicates that a latency for the path is higher than a first threshold latency value and the determined KPI requirement includes a latency requirement below a second threshold latency value; and one or more instructions to establish the communication session or data flow in the transport network using the selected path.

* * * * *